March 7, 1944.        E. H. UNKLES ET AL        2,343,594
SIGN CONTROL AND SYSTEM
Filed Dec. 28, 1940        5 Sheets-Sheet 1
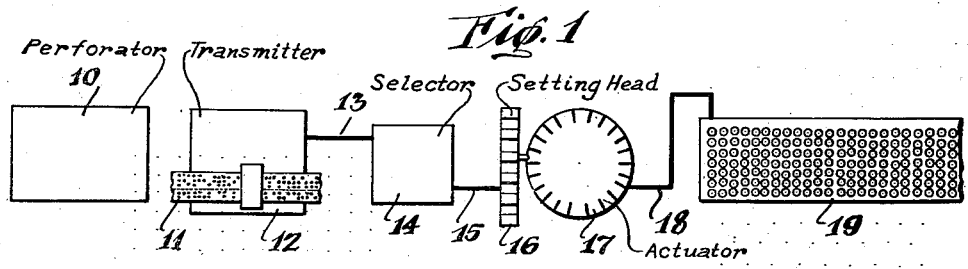
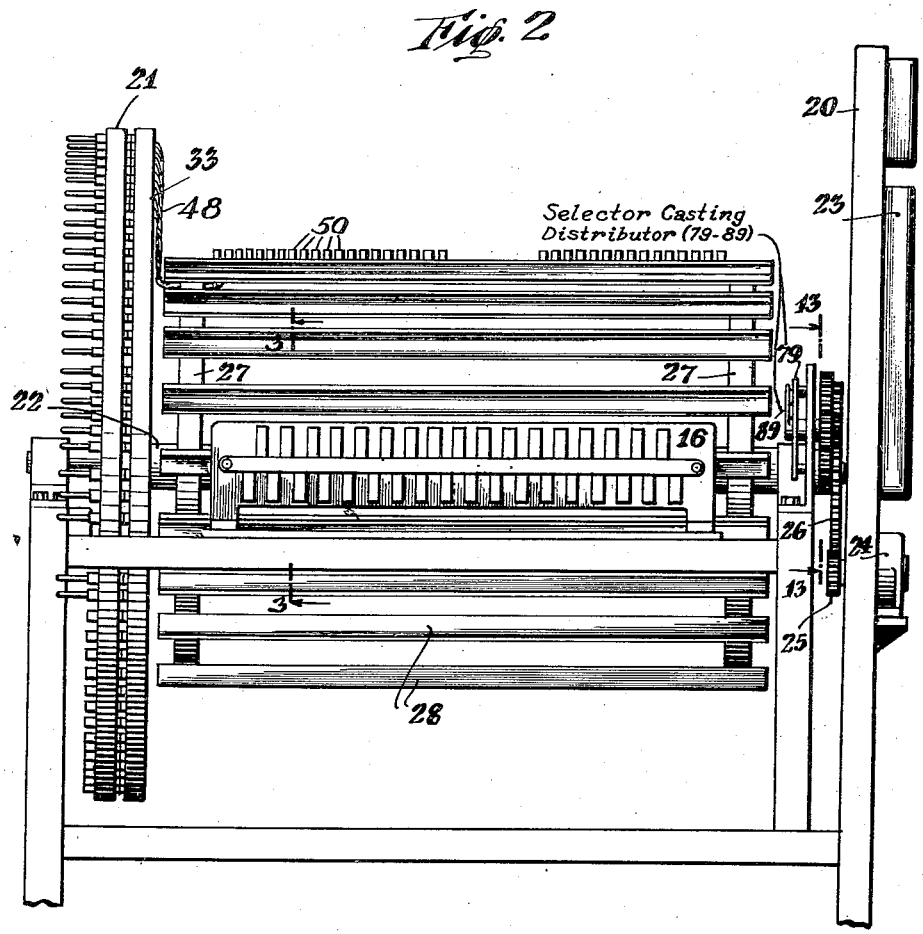
INVENTORS
EDWARD H. UNKLES
BERT W. ROTH
CHARLES S. WHITNEY, Jr.
BY Duell, Kane and Smoot
ATTORNEYS March 7, 1944.  E. H. UNKLES ET AL  2,343,594
SIGN CONTROL AND SYSTEM
Filed Dec. 28, 1940  5 Sheets-Sheet 2
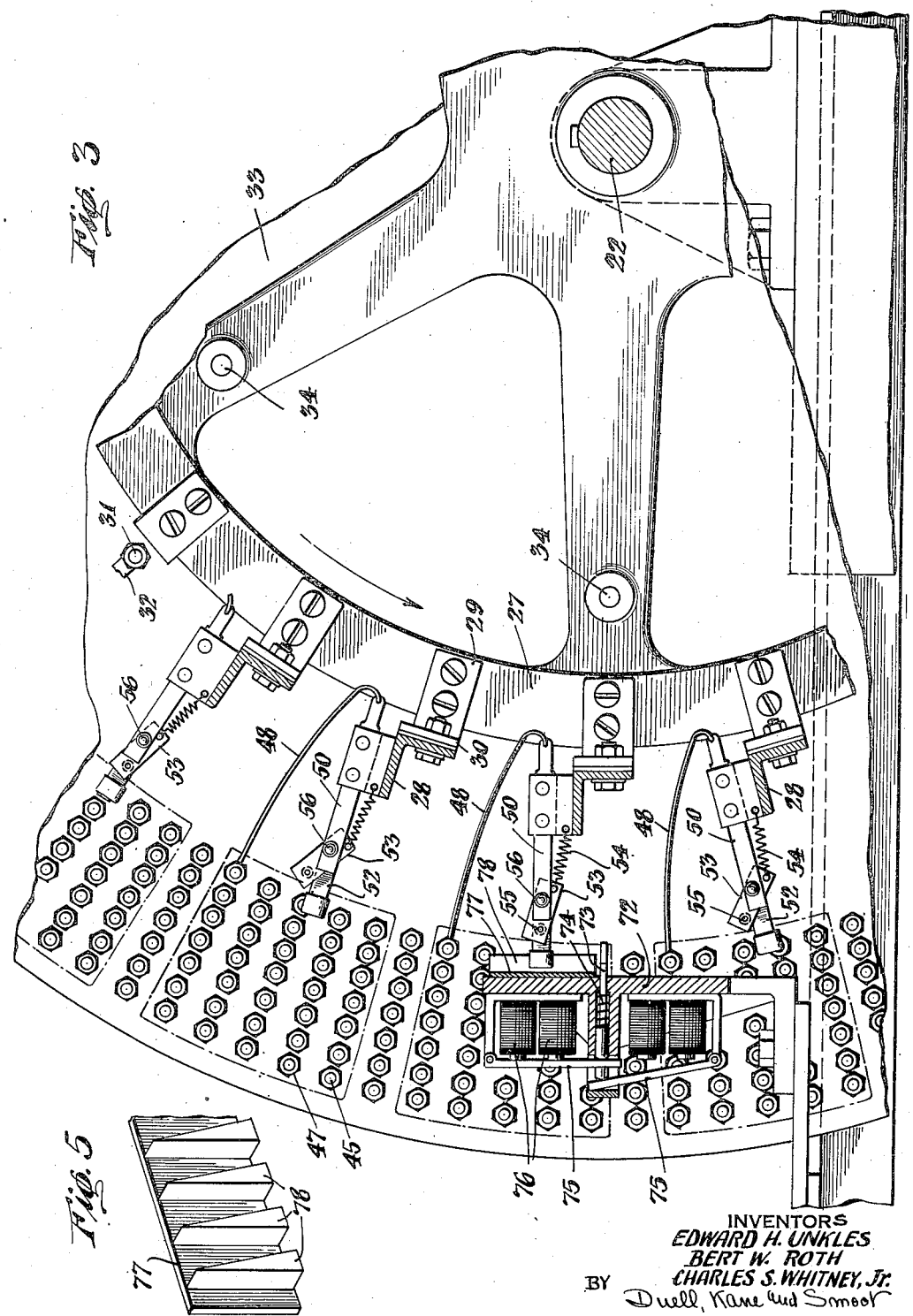
INVENTORS
EDWARD H. UNKLES
BERT W. ROTH
CHARLES S. WHITNEY, Jr.
BY Duell, Kane and Smoot
ATTORNEYS

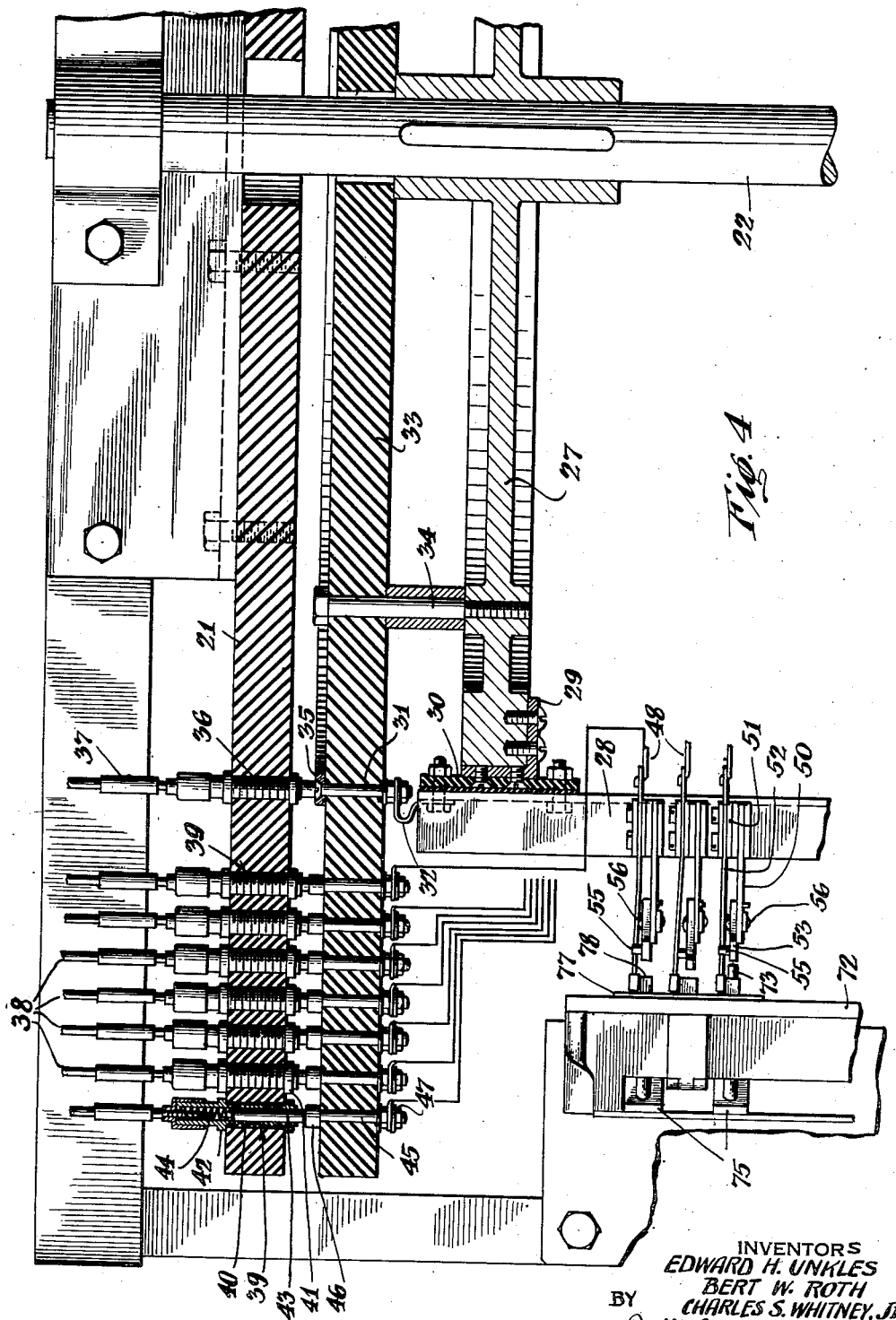

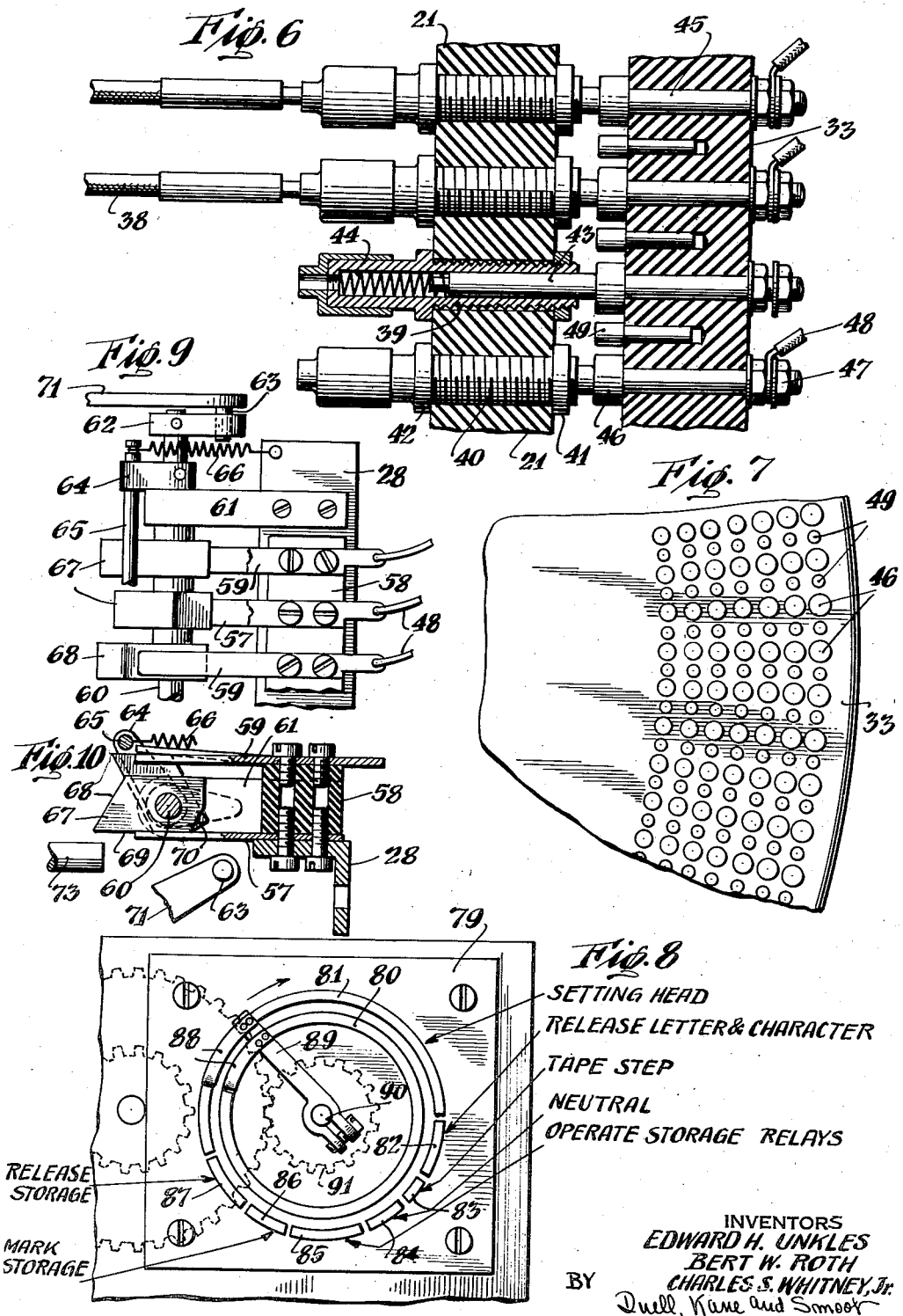

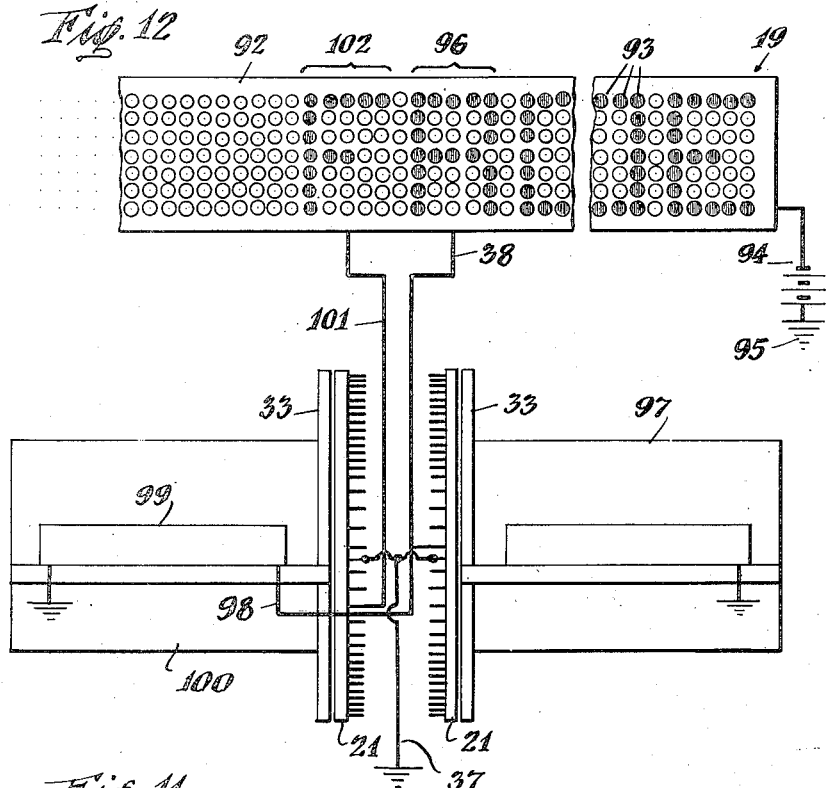
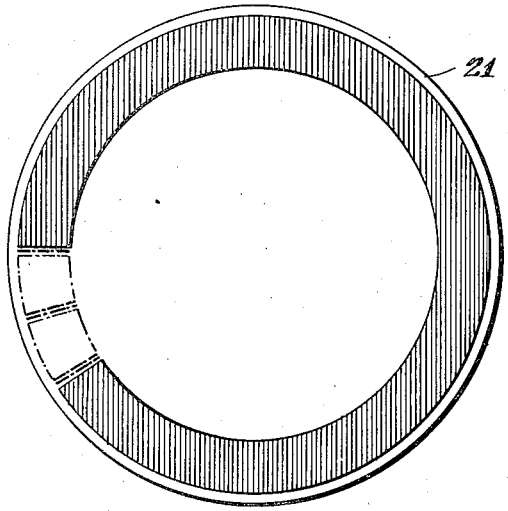
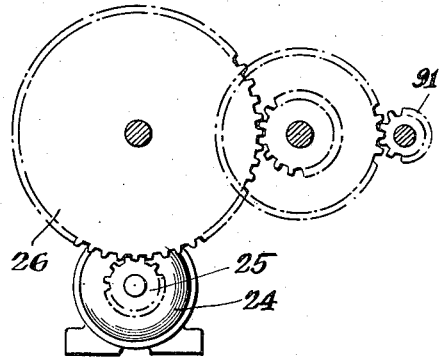

Patented Mar. 7, 1944

2,343,594

UNITED STATES PATENT OFFICE 2,343,594

SIGN CONTROL AND SYSTEM

Edward H. Unkles, Weehawken, and Bert W. Roth, Interlocken, N. J., and Charles S. Whitney, Jr., New York, N. Y., assignors, by mesne assignments, to Trans-Lux Ad-News Corporation, New York, N. Y., a corporation of New York Application December 28, 1940, Serial No. 372,090

19 Claims. (Cl. 177—346)

This invention relates to a structurally and functionally improved control as well as to a system within which such control may be embodied. In its more specific aspects, the present control is primarily intended to govern the operation of a display which may coveniently include a bank of light bulbs or other energizable elements.

It is well appreciated that numerous forms of displays have heretofore been developed. Certain of these displays have been known as "Travelling Message Signs" and have included a bank or series of display elements, such as light bulbs, disposed upon a display field or surface, said display elements having been energized and de-energized in a manner such that decipherable indicia have been displayed upon the sign. Moreover, these signs have included controllers so that an illusion has been created that the indicia appeared to advance across the field of the sign; this illusion being created by a sequential energization and de-energization of the display elements forming the sign.

However, in an apparatus of this type, numerous difficulties have occurred largely due to shortcomings in the unit which has controlled the energization and deenergization of the individual elements forming the sign as well as to the somewhat inflexible nature of the system which has created the initial impulse necessary for the operation of the unit in a manner to provide the desired indicia.

Thus, it is a primary object of the invention to furnish a system for the control of a sign or similar apparatus and by means of which the indicia to be displayed may be quickly changed and rearranged so that, if desired, it will be entirely feasible to disseminate information with respect to news events and by which such information can be displayed almost currently with cognizance of such news by an operator. In this manner, it will be apparent that an extremely flexible system is furnished, of which the sign may form a part, so that the objections heretofore arising in this connection will be completely avoided.

A further object of the invention is that of providing a sign controlling mechanism which may readily be applied to signs already in existence and which will be free from the numerous difficulties and objections heretofore levelled against similar units.

Another object is that of furnishing a controller, the operation of which may be governed in numerous different manners, but which, in any event, will serve to at all times cause a proper functioning of the associated display sign and which at the same time will embody a relatively simple construction comprising individually rugged parts capable of ready assemblage to furnish a unit operating over long periods of time with freedom from difficulties.

Moreover, a control or actuating mechanism such as is contemplated in the present invention will, in itself, embody a flexible construction so that with only slight modification, the apparatus may control signs which vary widely in general dimensions as well as over-all length.

With these and other objects in mind, reference is had to the attached sheets of drawings illustrating practical embodiments of the invention and in which:

Fig. 1 is a diagrammatic view of a layout of apparatus such as may be embodied in a control system and sign;

Fig. 2 is a front view of a form of actuating mechanism such as may be embraced within the system;

Fig. 3 is a fragmentary enlarged sectional view taken along the line 3—3 in the direction of the arrows as indicated in Fig. 2;

Fig. 4 is a fragmentary sectional plan view of certain of the actuating mechanism as shown in Figs. 2 and 3;

Fig. 5 is a fragmentary perspective view of the switch resetting mechanism embodied in the actuator;

Fig. 6 illustrates the assembly of contacts which may be associated with the actuator;

Fig. 7 is a face view of a fragment of a bank of contacts as shown in Fig. 6;

Fig. 8 is a face view of the synchronizer or controller which acts as a distributor and is conveniently associated with the actuating mechanism;

Fig. 9 is a fragmentary plan view of a group of switches which may be employed in lieu of those shown in Figs. 3 and 4;

Fig. 10 is a sectional side view of the switches as shown in Fig. 9;

Fig. 11 is a somewhat diagrammatic end view of the actuator or controller;

Fig. 12 is a similar view showing the manner in which two or more of these units may be connected to control a sign; and Fig. 13 is a sectional end view taken along the line 13—13 and in the direction of the arrows as indicated in Fig. 2.

It is to be understood that the present invention has primarily to do with a controller which is intended to be operatively connected to a sign comprising a bank or field of illuminated elements such as light bulbs. Thus, according to one aspect, it will be appreciated that the actuating mechanism is the construction on which patent coverage is primarily sought in the present application. In other words a unit, as is herein contemplated, may be connected to a sign of the type indicated and which may have been heretofore constructed and controlled by some mechanism in common usage for some time past. The presently contemplated control may readily be substituted for the old mechanism and will serve to govern the operations of the signs in a far more desirable manner than has heretofore been possible.

Moreover, and except where the contrary is indicated in the appended claims, it will be understood that the control mechanism may be operated or governed by numerous layouts of apparatus different from those which have been illustrated in the appended drawings and which will be described in the following specification. This statement is qualified only to the extent that according to the present invention, some form of synchronizing mechanism should preferably be present and so that the results appearing upon the controlled sign will be desirable and proper in all respects.

With the foregoing in mind, attention is primarily directed to Fig. 1 in which one form of general layout of the entire system has been illustrated. In this view, the numeral 10 indicates what is commonly known as a perforator which serves to act on a tape 11. This tape is associated with a unit 12 commonly known as a transmitter and which in any desirable manner—as for example, by leads 13,—may be connected to a selector 14. While the selector may embrace numerous different forms of mechanism, it preferably includes a group of relays which are coupled by leads 15 to transmit impulses to a setting head generally indicated at 16. This setting head is disposed adjacent and in operative association with an actuator 17 which is connected by leads 18 to a sign generally indicated at 19.

It is primarily to be understood that the perforator 10 forms no part of the present invention excepting insofar as it may be desirable or necessary to provide a tape 11 or other suitable record. If this tape 11 be of the type now commonly known on the market, it will comprise a strip of paper formed with perforations corresponding to any desirable code arrangement. As is well known, perforator units such as that indicated at 10 may be formed with a key board corresponding more or less to a typewriter key board and these perforators include mechanisms which by means of five or any other desirable number of pins or elements form certain aggregations of perforations on a tape in response to each actuation of the key board of unit 10. Also, these tapes are commonly provided with a row of feeding perforations. After the tape has been perforated or otherwise treated by the unit 10 it is associated with the transmitter 12. This transmitter commonly includes a step by step feeding mechanism engaging the feeding perforations in the tape. It also has a series of pins corresponding in number to the particular set-up of apparatus provided in accordance with a given code, and as a result of which electrical impulses are transmitted. Ordinarily, these impulses will be sent over the leads 13 to the selector 14. As afore brought out, the latter conveniently includes a series of relays which in response to the transmitted electrical impulses, will operate in a certain manner and/or sequence and such that definite units of the setting head 16 are caused to function in response to impulses transmitted over leads 15.

Thus, with such a set-up of apparatus, the keys of unit 10 actuated by an operator will eventually cause an operation of the units or elements associated with the setting head 16. Obviously, the tape may be taken from unit 10 and directly associated with the transmitter 12, in which case and according to the proximity of these units, a more or less direct operation of the setting head 16 will follow an actuation of the keys of unit 10. On the other hand, it will be clearly obvious that a pre-determined section of the tape or functionally equivalent unit, may be removed from the mechanism which provides the same and distributed to the transmitter at any desired interval after it is formed by unit 10. If such record simply passes through the transmitter one time, a corresponding operation of the setting head will occur. If, however, the ends of the tape are, for example, coupled so as to provide an endless record, the tape will continue to pass through the transmitter and in this manner a continuous and repeated operating sequence of the setting head will occur.

It is also to be understood that the setting head and the adjacent actuator may be disposed in any desired location with respect to the transmitter and selector. In other words, the latter units may be disposed at a relatively remote point or one or both closely adjacent a setting head. Additionally, one or both of these units might obviously control any desired number of setting heads. In any event, however, the head or heads serve to cause a functioning of a corresponding number of actuators. The latter will include a circuit closing and opening mechanism such that the circuit through leads 18 extending therefrom, will be closed to in turn energize the bulbs or other elements associated with the sign 19. The actuator or actuators include contacts corresponding in number to the number of bulbs or equivalent elements associated with sign 19. Conceding relative movements between these contacts and the circuit closers and openers, it follows that the sign will be energized to display the desired characters, symbols, or other indicia. Also, it follows that while the sign—as herein contemplated—will in its display surface, embrace no moving parts, the effect of a travelling sign will be created. In other words, according to the speed of relative movement of the parts of the actuator, the indicia will seemingly traverse the field of the sign in that a sequential energization and deenergization of the individual elements or bulbs of the sign will be caused by the actuator and consequently an illusion will be created that the displayed indicia are actually traversing the field of the sign.

To those skilled in the art, the general structure embraced in the perforator 10, tape 11, transmitter 12, and selector 14 will be well known. Also, the numerous alternative structures which might be employed will be obvious. However, if detailed information in this respect is desired, attention is directed, for example, to chapter 5, "Printing Telegraph Mechanisms," appearing pages 125 to 276, inclusive, of the book by H. H. Harrison, issued in 1923 by Longmans Green and Co., and entitled "Printing Telegraph Systems and Mechanisms." The general structure present in the selector will also be readily apparent to those skilled in the art. For a detailed understanding of such structure, its specific operation and wiring, attention is invited to, for example, the co-pending application for United States Letters Patent in the names of Merton L. Haselton and Charles S. Whitney, Jr., entitled "Travelling message sign" and identified in United States Patent Office records as having been filed on July 24, 1940, under Serial No. 347,336.

For a disclosure of the general set-up of apparatus, and including also a form of setting head, actuator, and sign, attention is directed to the prior United States Patent to C. F. Borschneck, No. 1,110,872 on "Electrical display system," issued September 15, 1914. At the risk of repetition, it is again emphasized that the present application has primarily to do with an improved construction of setting head and actuator and the control of the latter by a suitable mechanism, the operation of which is in turn, governed by the actuator.

Thus, referring initially to Fig. 2, it will be seen that the reference numerals 20 and 21 indicate side walls which are preferably fixed and between which a shaft 22 is rotatably supported. The wall 20 may mount a casing 23 which houses the selector 14. This wall may also mount a motor 24 which as shown, especially in Fig. 13, serves by means of reduction gearing (not shown) which may be housed within its casing to drive a gear 25. The teeth of the latter in turn, mesh with the teeth of a gear 26 secured to shaft 22. Having in mind that gear 25 is smaller than gear 26 and further keeping in mind the reduction drive embodied within the motor casing 24, it is obvious that shaft 22 will be rotated at a relatively slow speed.

Secured to shaft 22 and adjacent the ends of the same are a pair of hubs 27. As illustrated, especially in Fig. 4, these hubs carry adjacent their peripheries, an annular series of bars 28. Such mounting of the bars is preferably achieved by employing securing elements 29 which extend respectively from the bars and hubs and which are mounted by a layer of die-electric material 30 interposed between these elements. In this manner, the bars are insulated from the frame of the machine.

These bars may be grounded, however, by connecting each of the same to terminals 31, by, for example, leads 32. These terminals are mounted by a disc 33 of insulating material which is secured to rotate with the adjacent hub by means of coupling bolts 34 or any other desired structure. The terminals or posts 31 are connected to a ring 35 conveniently exposed on the exterior face of disc 33. This ring is engaged by one or more contacts 36 mounted by wall 21 and from which a lead or leads 37 may extend.

In order to adhere to simplicity of illustration, it is considered in the present application that the sign or display surface will present a plurality of more or less conventional electric bulbs. It will also be assumed that the sign comprises seven horizontal rows of these bulbs and that the display area will be of a length such that, for example, only twenty indicia spaces are included therein. Now as is well known to persons familiar with display work, a group of lights 35 in number and which comprises a block, seven bulbs in height as against five in width, are adequate to permit the formation of virtually any desired symbol or element of indicia which is to be displayed. With at least one row of lights inoperative between each indicia element, each of the seven horizontal rows will include in its length, substantially one hundred and twenty bulbs in order to allow of twenty indicia elements being simultaneously displayed. Each of the bulbs is connected to one side of a suitable source of current supply. The other side of such source may be conveniently grounded. A second lead extends from each of these bulbs and these leads have been identified by the numerals 38. Each of the latter leads in turn is connected to a contact member 39 mounted by the wall 21. As shown especially in Fig. 6 each contact assembly may include a threaded sleeve 40 extending through an aperture in wall 21 and secured against displacement at its respective ends by, for example, a nut 41 and an enlarged head portion 42. A contact plug or brush 43, as shown in Figs. 4 and 6, is slidably disposed within sleeve 40 and is urged outwardly by a spring 44. Thus, with the leads 38 secured one to each of these assemblies, it is apparent that each individual bulb of the sign may be grounded through the plugs or brushes 43, as hereinafter described. Units of this character are more or less standard construction, in arts foreign to signs and controllers therefor, and it will be understood that the contact element 36 secured to lead 37 preferably follows the same general construction.

As also shown in Figs. 4 and 6, terminal members including bodies 45 extend through the disc 33 and exceed in number—in the illustrated embodiment—the contact members generally indicated at 39. This excess, for reasons which will hereinafter be brought out, includes in the present instance, some eighty-four terminals which would account for two indicia groups of thirty-five each plus two lines of spacing corresponding each to seven terminals. These terminals present adjacent one of their ends, head portions 46 and adjacent their opposite ends may include nut and washer assemblies 47. To each of the latter, leads 48 are coupled. Interposed between the heads 46 are supporting elements 49 which extend into the plane of the head portions 46 and provide what might be termed bridging elements between these heads. Consequently, if the brush or contact members 43 are caused to move relative to the terminals, they will not under the influence of springs 44, be projected to positions between the heads 46. At the same time, and due to the spacing of the heads and the width of the contacts, electrical connection between a given contact 43 and the head of one terminal element may not be established until after the electrical connection between such contact and a corresponding terminal element in the preceding row has been broken.

Each of leads 48 is connected to a switch element. As shown especially in Figs. 3 and 4, one form which each of these switch elements may take is that of a rigid arm 50 secured to and grounded against one of the bars 28. Insulated from arm 50 by means of layers 51 is a spring arm 52. Pivotally secured to arm 50 is a subsidiary arm portion 53 and a spring 54 which normally maintains this arm portion in a position such that it has only slight angularity with respect to arm 50. In such position, an insulating stud 55 bears against the inner face of spring arm 52 to maintain the latter out of contact with all parts of arm 50, portion 53, or the pivot 56 connecting the same. However, if arm portion 53 is rocked against the tendency of spring 54 then stud 55 moves beyond the edge of arm 52 and the latter may move into contact with, for example, the pivot 56. In this manner, the circuit from any one of the terminals through lead 48 will be closed through arm 52, arm 50, bar 28, lead 32, terminal 31, ring 35, contact 36 and lead 37. Consequently, if—as afore brought out—one side of each individual bulb is coupled to a source of current supply which in turn has its opposite side grounded, it is obvious that with the corresponding switch element closed, the opposite side of the bulb will be grounded through lead 37—it being understood that such lead is coupled to a common ground.

A second form of switch which may conveniently be employed to assure the desired results has been illustrated in Figs. 9 and 10 in which the numeral 28 again indicates the bar and upon which a spring arm 57 is mounted in such manner that the arm is grounded through this bar. A layer of insulating material 58 may be supported beyond bar 57 and have in turn secured to it, a second spring arm 59. A number of these pairs of arms are provided. Extending between the arms, is a shaft 60 which is rotatably mounted in support 61 and preferably has at least one of its ends extending beyond such support. Secured to the shaft is an arm 62 engageable by a pin 63. Also secured to the shaft at a point conveniently beyond the support 61 is an arm 64. This arm is one of a pair (the second being not shown) and between which a rod 65 is supported. A spring 66 is coupled to this rod and to the bar 28 and serves normally to maintain shaft 60 and arm 62 in pre-determined positions.

Rotatably mounted upon shaft 60 are a plurality of bridging or circuit closing elements conveniently including bodies 67 having flattened edge portions of which 68, 69, and 70 have been identified by reference numerals. In their normal position, elements 67 are supported upon shaft 60 in a manner such that their edge portions 69 are engaged by spring arms 57. In this manner, they are maintained against any probability of accidentally shifting. Also in such position, their upper edge portions do not engage arms 59. Accordingly, a gap is provided in the circuit. When bodies 67 are rotated around shaft 60, it will follow that edges 69 and 70 will shift with respect to arm 57 until surface 70 has engaged that arm. Simultaneously, edge portion 68 will engage arm 59. Thus, in the latter position, body 67 will bridge the spaces between these arms and the corresponding circuit will be closed at this point.

Now assuming that one or more of the bodies 67 have been shifted to the last described position, it will be understood that they may be returned to their normal position by simply rocking rod 65 to cause the latter to engage with edge portion 68 of those bodies 67 which have been shifted. Thereafter, and with a continued movement of the rod, bodies 67 will rotate with respect to shaft 60 and the point of juncture of edge portions 70 and 69 will cam with respect to arm 57 until body 67 is again returned to its normal position. In such position, and as afore brought out, the parts will be maintained against displacement.

To assure such an operation of rod 65, the wall 20 or some other fixed part of the machine may carry a detent 71 which is disposed adjacent the path of travel of the bars 28. Detent 71 supports pin 63, or if desired, arm 62 may carry pin 63. In any event, however, as the bars 28 move, the arm 62 will be caused to rock incident to the connection which will be established between this arm and the detent. In such rocking, the shaft 60 will be rotated to shift arms 64 and rod 65 against the action of spring 66. As afore brought out, the latter will function to reset the switch elements, i. e., to shift them to a position where the circuits of which they form a part are open.

As will be apparent, the connection between detent 71 and arm 62 will be broken as the particular bar 28 in question moves beyond the resetting station. With the rod 65 returned to its normal position, the switch elements will again be disposed in a manner in which they may readily be shifted to circuit closing position. These switch elements similarly to those described in connection with Figs. 3 and 4 will preferably correspond in number to the number of bulbs or similar units in any given indicia group. In other words, in the illustrated embodiment, thirty-five of these switch elements will be supported upon each of the bars and these bars— in the embodiment illustrated—will be twenty-two in number.

Moreover, in accordance with the illustrated embodiment and regardless of whether the switch includes a structure such as has been shown in Figs. 3 and 4 or the structure which has been shown in Figs. 9 and 10, thirty-five switch elements will be present on each bar. Each one of these switches will control one of the bulbs of a given area or group adequate to provide legible indicia of characters. With twenty-two bars 28, it is thus obvious that the switch groups mounted on twenty of the bars are adequate to control fully all of the bulbs or functional equivalents which go to make up the sign shown in the illustrated embodiment. The switch groups on the remaining two bars will, therefore, at a certain point, be, in effect, inoperative to complete any of the sign circuits; the purpose of this construction being hereinafter more fully brought out.

Now considering the structure of the setting head which will preferably be of the same general design regardless of the type of switch employed, attention is directed especially to Figs. 3 and 4 in which such head has been shown in association with a switch of the first type described herein. It will be noted that the head conveniently includes a plate 72 extending parallel to the shaft 22 and beyond the path of travel of the bars 28. This plate is formed with a series of perforations through which the ends of plungers 73 extend. These plungers are normally maintained in retracted position by springs 74. Armatures 75 may cooperate directly with the ends of the plungers in order to project the latter against the action of these springs, and electro-magnets 76 may be secured to the plate to operate these armatures. The plunger and electro-magnet assemblies correspond in number to the number of such elements provided and the magnets are connected to the selector 14 by means of leads (not shown). As indicated in Fig. 3, the bars are in movement with respect to the setting head in the direction of the arrow.

In advance of this setting station, there will be disposed either the detent 71 as described in connection with Figs. 9 and 10, or else a structure such as has been shown in Fig. 5. The latter is primarily intended for use in conjunction with switches of the nature shown in Figs.

3 and 4. This element may include a plate 77 which is secured to the outer face of plate 72 and has extending from its face, a plurality of cam elements 78 which define tangentially extending channels corresponding in number to the number of switches. Arms 52 of these switches are longer than the combined length of arms 50, even in conjunction with arm portion 53. The spacing of the bars 28 from the plate 77 is such that only the relatively extending end portion of arms 52 will ride within the channels and engage the cam faces. In such engagement, it is apparent that with continued movement of the bars with respect to the setting head, arms 52 will be caused to move to the left as viewed in Fig. 4. Consequently, they will shift to positions at which studs 55 clear their edge portions and thus under the influence of springs 54, arm portions 55 may return to their normal positions. In such positions, the circuit is interrupted.

Thus, immediately in advance of what might be termed the switch closing station, there is a reset station. Whether the switch structure shown in Figs. 3 and 4 or that illustrated in Figs. 9 and 10 is employed, it is apparent that at this station, any switches which are closed will be returned to open positions. It is only after the switches are in such positions that the setting head as defined especially by the outer portions of plungers 73 will function to close those switches which are adjacent the plungers which have been projected. As will be apparent, such closing of the switches occurs in the structure shown in Figs. 3 and 4 by the outer ends of arm portions 53 riding against the projected ends of the plungers until they clear the latter. When they are shifted to the latter positions, plugs 55 will be clear of the upper edge portions of arms 52. In the former structure shown in Figs. 9 and 10, the plunger ends 73 contact the edge portions 69 of the bodies 67 adjacent their outer ends. In order to clear the projection of the plungers, body 67 must rotate around shaft 60 to positions at which the edge portions 68 and 70 of the same respectively engage arms 59 and 57.

The energization of the electro-magnets 76 and/or the projection of the plungers or other switch closing elements may occur in any desired manner. However, it is preferred that the magnets be energized by a selector mechanism as afore mentioned. With the shaft 22 revolving at a substantially constant rate of speed in order to create the illusion of a travelling sign which also has a fixed rate of speed, it will, of course, be understood that the switches must be actuated as they move past a pre-determined station—in this instance, the setting head. At this instant, the mechanism for closing the switches in accordance with the pre-determined pattern must be operative. Immediately thereafter, it must be reset so as to operate the next series of switch elements which will traverse the station incident to the movement of the next succeeding bar 28 or supporting unit past the same. As afore brought out, it is preferred to employ a selector mechanism which will transmit the desired impulses to the setting head and which selector will comprise a series of relays. As has been seen, this mechanism in turn operates in response to impulses emanating in a transmitter of any desired and proper type and the transmitter in turn functions as a consequence of a record—such as a tape—being associated with it. Obviously, therefore, the operation of the record and transmitter must be timed in a manner such that as the different series of switches move past the setting head, the latter in each instance will be operative to set up a different character, numeral, or symbol on the sign.

A distributor mechanism whereby the desired result is achieved has been especially shown in Fig. 8 in which a synchronizer or timing mechanism has been illustrated. This may include a body 79 of insulating material mounting a length 80 of conducting material as well as arcuate segments 81, 82, 83, 84, 85, 86, and 87 also of conducting material and which segments are arranged in the form of a circle. Traversing the conducting strips or bodies 80 to 87, inclusive, is a pair of brushes 88 which are mounted upon an arm 89 secured to a shaft 90. The latter rotates in the direction indicated in the arrow in Fig. 8 and the shaft 90 may be driven as shown especially in Fig. 13 by having the teeth of gear 26 driving a multiplying train ending in a gear 91 to which shaft 90 is secured. Incident to the drive thus established, it is found that shaft 90 will make twenty-two revolutions for each revolution on the part of shaft 22. There being, in the illustrated embodiment, twenty-two series of switch elements associated with the latter shaft, it follows that shaft 90 will complete one revolution as each of the different series of switch elements traverses any given station.

The leads which extend to at least certain of the contacts 80 to 87, inclusive, have not been shown. Suffice it to say that one of the leads is connected to the circular contact 80 and that other leads may be connected to the contact segments 81 to 87. Thus, the circuit between these contact strips will be bridged by the brushes 88. As the brush traverses segment 83, an impulse is transmitted through the selector mechanism 14 back to the transmitter 12 which causes the mechanism of the latter to advance the tape 11 or other record one step. Segment 84 is preferably furnished so as to provide a continuation of the contact path. However, while the brush is traversing this segment, no different functioning of the mechanism occurs. Rather, sufficient time is permitted to elapse during this interval of traversal so that the record or tape 11 may be shifted forward one step in accordance with the impulse created by closing the circuit through segment 83. In other words, this step might be termed a neutral or inoperative one. A traversal by the brush of segment 85 results in a closing of the circuits between the relays of the selector mechanism 14 in response to the particular code impulse transmitted as a consequence of the then operative portion of the record cooperating with the transmitter 12. Consequently, segment 85 is for the purpose of operating the storage relays within the selector. A traversal by the brush of the next succeeding segment 86 results in current being transmitted through the contacts of the relays within the selector and which contacts have been closed or have remained open incident to the brush traversing segment 85. The brush thereupon traverses segment 87 which serves to interrupt the energization of the storage relays within the selector and so that such relays will be ready to receive a succeeding impulse from the transmitter. As the brush traverses segment 81, the circuits are closed through the electro-magnets which operate the plunger and in accordance with the pattern as determined by the impulse emanating from the transmitter 12. Consequently, those switches which are passing the setting head station at that particular moment will be operated. The plungers or equivalent switch closing units will continue in operative position while the brush is traversing all of segment 81. In this manner, there will be adequate assurance that an ample interval will exist for the switches to be closed. Thereupon, the brush will traverse segment 82 which serves to release the circuit closing elements of the relays such that contact is interrupted; it being noted that these contacts have been closed ever since the brush traversed segment 86.

The brush will now again traverse segment 83 resulting in the record or tape being advanced a further step and the entire operation will be repeated. Synchronizing or controlling mechanisms of this general type are, of course, well known to those skilled in the art. However, it is to be observed that contrary to such accepted practice, the distributor or synchronizer herein employed actually controls the movement of the record or tape by sending through an impulse to the transmitter such that the latter advances the tape one step. In this manner, perfect synchronization and timing is assured.

Attention is now directed to Fig. 11 which shows in diagrammatic form, the inner face of wall or plate 21. The area of contacts 39 has also been indicated on this wall. As will be observed, this series of contacts may be interrupted adjacent the setting head station at which point, two groups of indicia providing contacts are omitted. As a consequence of this construction, it is apparent that as the bars 28 or other switch carrying elements traverse the re-setting or switch opening station and the terminals 45 connected to such switches will no longer be in engagement with live terminals or contacts connected to leads 38. This will also be true throughout the subsequent switch-closing station. Consequently, no current will at these stations be flowing through any of the switches and, therefore, no arcing will occur. As will be obvious, this is an extremely desirable feature and will contribute materially to the proper operation of the unit.

As has been seen in the preceding description, the particular actuator which has been illustrated carries twenty-two series of switch elements. In view of the fact that two groups of these switches traversing the setting head station are de-energized (i. e., have no current flowing through them), it is apparent that only twenty switch series may be operative at any given instant. This will provide for twenty indicia spaces upon the sign field. However, it will likewise be obvious that many signs may embrace a field, the length of which will call for a far greater number of indicia spaces. It is, of course, apparent that by simply enlarging the radius of the path through which the switch supporting bars travel, that bars may be added as desired and the capacity of the system accordingly increased. However, for practical reasons, it frequently is undesirable to increase to any material extent, the diameter of the actuator.

One method of overcoming any difficulties in this connection has in accordance with the present invention been illustrated in Fig. 12 in which the sign indicated at 19 has been shown in greater detail. This sign embraces a body 92 mounting a series of bulbs 93. One side of a current source 94 may have leads extending to one terminal of these bulbs. The other side of this source is grounded as indicated at 95. The leads extending from the source to the bulbs are continued beyond the latter in the form of leads 38. Assuming that the bulb group indicated at 96 is the last one energized by the actuator 97 in this figure, then it will be understood that the leads 38 extending from the group 96 will be in the form of a group of contacts carried by wall 21 at a point immediately preceding the re-setting or switch releasing mechanism. These leads 38 in addition to being connected to contacts 43 of the actuator 97 will be connected to leads 98 extending to a setting head 99 associated with an adjacent actuator unit 100. Accordingly, simultaneously with the closing of the circuits through the group of bulbs 96, the setting head 99 will have its plungers operated. Thus, the series of switches forming a part of actuator 100 and which are traversing the setting head 99 of the latter, will be forthwith thrown to closed positions. Leads identified in Fig. 12 as 101 extend from the first group of energized contacts of actuator 100 to the bulbs embraced in group 102. This group immediately succeeds the group 96 on the sign body 92. Therefore, it is apparent that without any visual interruption in operation of the sign, the circuit, through this group 102 and succeeding groups of bulbs, will be energized by the second actuator. If the length of the sign warrants it, further actuators may, of course, be provided ad infinitum in accordance with the foregoing disclosure.

In all forms of mechanism, it will be appreciated that in accordance with the present teachings, the return or circuit is not grounded through the frame of the machine but rather is returned to a suitable ground through the lead 37. Also, as indicated in Fig. 12, the same source of current supply with or without the interposition of transformers (not shown) may be employed for both the energization of the bulbs or other sign elements as well as the electromagnets of the second and subsequent actuators. In each instance and viewed from one aspect, a single actuator assembly as shown in Figs. 1 to 11 is to be regarded as including a number of related but independent circuits. For example, there is primarily the group of bulbs associated with the sign, the source of current supply, and the circuit which includes such source, the bulbs and the switch elements. A second group of circuits and which controls the first group, includes a source of current, the electro-magnets, and the contact carrying arms of the relays within the selector 14. The third circuit includes such relays and the transmitter. Timed by the physical movement of the parts within the first group of circuits is the distributor which acts as a synchronizer or controller and which in turn correlates the elements of the second and third circuit groups to the speed of operation of the actuator. In the latter sense of the word, one might say that a coupling is furnished which harmonizes the functions of all three circuits. The manner in which such coupling might be extended and amplified to include, for example, a perforator or equivalent mechanism, will, of course, be obvious.

Finally considering the operation of the foregoing apparatus and with particular reference to Figs. 1 to 11 it will be appreciated that with the parts properly connected, a record is associated with the transmitter. According to the code provided, impulses occur through to the selector which results in a closing of contacts within the latter such that selected and pre-determined electro-magnets of the setting head are energized. Consequently, certain of a series of switches traversing the setting head are closed. This closing occurs with no current attempting to pass through these switch structures so that no arcing occurs. As soon as the switches move to a position beyond the setting head, the terminals connected to the former engage the contacts connected to the bulbs or other display elements and current may, accordingly, flow through the switches and be grounded through one or a series of leads 37. However, current will not flow through the frame of the machine, as it will be prevented from doing so by the insulating material which in each instance is interposed between the bars 28 and the shaft 22. An element of indicia will now appear in the field of the sign and this element will traverse such sign at a speed precisely proportionate to the speed of movement of the terminals 46 relative to the contacts 43.

While the series of switches which have just been considered, move away from the setting head, the synchronizer or controller shown in Fig. 8 will be functioning to cause the record to be advanced a further step and to also cause the plungers to again be set up according to a predetermined permutation and such that the desired succeeding character will appear upon the sign as this succeeding series of switches has the terminals 46 to which they are connected, engage the energized contacts 43. The characters thus produced will traverse the entire length of the sign controlled by the actuator and as the switch elements which set up any given character again approaches the setting head station, the terminals connected to the same will move out of engagement with the energized contacts. Accordingly, as the switches traverse the re-setting or switch opening station, no current will be flowing through the same and again no arcing will occur. As has been described in connection with Fig. 12, a whole series of actuator units may be connected together, and if desired, driven by a common shaft. Accordingly, the length of the sign need not be limited, nor need the dimensions of the actuators exceed certain pre-determined limits. As will also be apparent, the actuator and/or the controlling system therefor may readily be connected to a sign which has heretofore been built and under which circumstances it will serve to efficiently operate that sign.

In conclusion, it will be understood that the terms used throughout this specification and in the following claims, are to be considered in a general, rather than in a specific sense; it being apparent to those skilled in the art that the present illustration has been resorted to in order to present in one of its more simple forms the invention herein contemplated and that any number of alternative constructions within the purview of the present invention would suggest themselves. Thus, for example, where the expression "ground" has occurred, it is apparent that the return leads from the source of current supply might actually be connected to what is specifically known as a "ground" as shown in Fig. 12. Likewise, where the expressions "wall" and "plate" occur, no limiting definition is intended. It is again obvious that all that is desired is that of providing suitable adjacent and relatively movable supporting surfaces. Again—except where otherwise indicated in the claims—no limitation is intended nor differentiation is attempted in referring to "terminal" as distinguished from "contacts."

Thus, among others, the several objects of the invention are achieved. Obviously, numerous changes in construction might be resorted to without departing from the spirit of the invention as defined by the claims.

We claim:

1. A control including a plurality of contacts, terminals engageable with said contacts, means for shifting said terminals with respect to said contacts, a plurality of series of switches, relatively movable parts forming said switches, said parts being connected and individual to said terminals, said switches being adapted to close circuits through said terminals and the contacts, said contacts defining in aggregate, an energized field traversed by said terminals and a portion of said field being interrupted whereby the terminals traversing such interrupted portion and the switches connected to such terminals will be deenergized.

2. A control for a travelling message sign, said control including in combination, a body, a plurality of supports associated with said body, a series of switches carried by each of said supports, a setting head, means for causing movement of said head with respect to said supports and the switches, whereby the latter may be sequentially operated by said setting head, said switches each comprising a pair of relatively movable arms tending to normally move into electrical connection, means for preventing electrical connection between said arms, and means actuatable by the elements of said setting head for rendering said last-named means inoperative.

3. A control for a travelling message sign, said control including in combination, a body, a plurality of supports associated with said body, a series of switches carried by each of said supports, a setting head, means for causing movement of said head with respect to said supports and the switches, whereby the latter may be sequentially operated by said head, said switches each comprising a pair of relatively movable arms tending to normally move into electrical connection, means for preventing electrical connection between said arms, means actuatable by the elements of said setting head for rendering said last-named means inoperative, and means disposed in advance of said head for rendering said last named means again operative.

4. A control including in combination, a body, a plurality of supports associated with said body, a series of switches carried by each of said supports, a setting head, means for causing movement of said head with respect to said supports and the switches, whereby the latter may be sequentially operated by said head, said switches each comprising a pair of spaced arms, a cam rotatably mounted between arms, said cam having a width less than the distance between said arms, and being engageable by the elements of said setting head to be rotated with respect to said arms, the length of such cam being sufficiently great in such latter position to engage the respective arms and electrically connect the same.

5. A control including in combination, a body, a plurality of supports associated with said body, a series of switches carried by each of said supports, a setting head, means for causing movement of said head with respect to said supports and the switches, whereby the latter may be sequentially operated by said head, said switches each comprising a pair of spaced arms, a cam rotatably mounted between said arms, said cam having a width less than the distance between said arms, and being operable by the elements of said setting head to be rotated with respect to said arms, the length of such cam being sufficiently great in such position to engage the respective arms and electrically connect the same, means disposed adjacent each of said series of switches and shiftable to rotate said cam to a position at which the electrical connection between said arms will be interrupted and means disposed in advance of said setting head for operating said last-named means.

6. A control including a support, a bank of contacts mounted by said support, a second support, switches mounted by said second support, terminals also mounted by the same and connected one to each of said switches and whereby, with the switches closed, current may flow through the corresponding terminals, means for moving said supports with respect to each other, said switches being arranged in successive groups, the terminals connected to each of said groups being disposed in a plurality of rows engaging and movable with respect to said bank of contacts and means for selectively and simultaneously closing certain of the switches of one group to render corresponding terminals throughout a plurality of rows simultaneously conductive.

7. A control including a support, a bank of contacts mounted by said support, a second support, switches mounted by said second support, terminals also mounted by the same and connected one to each of said switches and whereby, with the switches closed, current may flow through the corresponding terminals, means for moving said supports with respect to each other, said switches being arranged in successive groups, the terminals connected to each of said groups being disposed in a plurality of rows engaging and movable with respect to said bank of contacts, means for selectively and simultaneously closing certain of the switches of one group to render corresponding terminals throughout a plurality of rows simultaneously conductive and means for thereafter simultaneously opening those switches which had been closed whereby all of the switches in said group will be in open condition.

8. A control including a support, a bank of contacts mounted by said support, a second support, switches mounted by said second support, terminals also mounted by the same and connected one to each of said switches and whereby, with the switches closed, current may flow through the corresponding terminals, means for moving said supports with respect to each other, said switches being arranged in successive groups, the terminals connected to each of said groups being disposed in a plurality of rows engaging and movable with respect to said bank of contacts, means for selectively and simultaneously closing certain of the switches of one group to render corresponding terminals throughout a plurality of rows simultaneously conductive, said second support being grounded, the sides of the switches opposite to those sides which are connected to said terminals being grounded to said second support and said contacts and terminals being ungrounded and insulated from their supports.

9. A control including a support, a bank of contacts mounted by said support, a second support, switches mounted by said second support, terminals also mounted by the same and connected one to each of said switches and whereby, with the switches closed, current may flow through the corresponding terminals, means for moving said supports with respect to each other, said switches being arranged in successive groups, the terminals connected to each of said groups being disposed in a plurality of rows engaging and movable with respect to said bank of contacts, means for selectively and simultaneously closing certain of the switches of one group to render corresponding terminals throughout a plurality of rows simultaneously conductive and further switch means connected to be operated in response to movements of said supports relative to each other, said latter switch means controlling the operation of said switch closing means.

10. A controller for a sign having a number of elements to be energized in sequence, said controller including a pair of relatively movable supporting members, a series of contacts substantially fixedly mounted by one of said supporting members and to be connected to the energizable elements of the sign, a further series of contacts substantially fixedly mounted by the other of said supporting members and having continuous and sequential engagement with said first named contacts as said members are moved with respect to each other, switches independent of each other and electrically connected one to each of the contacts of said further series, means for mounting said switches by the supporting member mounting said latter contacts, and means movable with respect to said switches for operating the same, said operating means including means for selectively closing said switches to close circuits through the connected contacts, as well as the contacts of the first named series engaged thereby and the energizable elements connected to said contacts, and means also forming a part of said operating means for opening said switches to interrupt said circuits.

11. A controller for a sign having a number of elements to be energized in sequence, said controller including a pair of relatively movable supporting members, a series of contacts substantially fixedly mounted by one of said supporting members and to be connected to the energizable elements of the sign, a further series of contacts substantially fixedly mounted by the other of said supporting members and having sequential engagement with said first named contacts as said members are moved with respect to each other, switches independent of each other and electrically connected one to each of the contacts of said further series, means for mounting said switches by the supporting member mounting said latter contacts; the individual contacts of one of said series being relatively spaced from each other, supporting means interposed between said contacts and providing bridging elements engageable by the contacts of the other series, and means movable with respect to said switches for operating the same, said operating means including means for selectively closing said switches to close circuits through the connected contacts, as well as the contacts of the first named series engaged thereby and the energizable elements connected to said contacts, and means also forming a part of said operating means for opening said switches to interrupt said circuits.

12. A controller for a sign having a number of elements to be energized in sequence, said controller including a pair of relatively movable supporting members, a series of contacts substantially fixedly mounted by one of said supporting members and to be connected to the energizable elements of the sign, a further series of contacts substantially fixedly mounted by the other of said supporting members and having sequential engagement with said first named contacts as said members are moved with respect to each other, switches independent of each other and electrically connected one to each of the contacts of said further series, means for mounting said switches by the supporting member mounting said latter contacts, means associated with the contacts of one series and tending to normally project the same into engagement with the contacts of the second series; the contacts of the latter series being relatively spaced from each other, supporting elements interposed between said latter contacts and providing bridging elements for engagement by the projectable contacts, and means movable with respect to said switches for operating the same, said operating means including means for selectively closing said switches to close circuits through the connected contacts, as well as the contacts of the first named series engaged thereby and the energizable elements connected to said contacts, and means also forming a part of said operating means for opening said switches to interrupt said circuits.

13. A controller for a sign having a number of elements to be energized in sequence, said controller including in combination a pair of relatively movable supporting members, a series of contacts substantially fixedly mounted by one of said supporting members and to be connected to the energizable elements of the sign, a further series of contacts substantially fixedly mounted by the other of said supporting members and having sequential engagement with said first named contacts as said members are moved with respect to each other, switches independent of each other and electrically connected one to each of the contacts of said further series, means for mounting said switches by the supporting member mounting said latter contacts; said switches each comprising contact arms and relatively movable cams for closing the circuits through said arms, means cooperable with said cams for shifting the same to circuit-closing positions, and means for subsequently shifting said cams to positions such that the circuits through said arms are interrupted.

14. A controller for a sign having a number of elements to be energized in sequence, said controller including in combination a pair of relatively movable supporting members, a series of contacts substantially fixedly mounted by one of said supporting members and to be connected to the energizable elements of the sign, a further series of contacts substantially fixedly mounted by the other of said supporting members and having sequential engagement with said first named contacts as said members are moved with respect to each other, switches independent of each other and electrically connected one to each of the contacts of said further series, means for mounting said switches by the supporting member mounting said latter contacts; said switches each comprising contact arms and relatively movable cams for closing the circuits through said arms, means cooperable with said cams for shifting the same to circuit-closing positions, and re-setting means including a bar movably mounted by the latter supporting member and cooperable with said cams to shift the latter to positions at which the circuits through said arms are interrupted.

15. A controller for a sign having a number of elements to be energized in sequence, said controller including a pair of relatively movable supporting members, a series of contacts substantially fixedly mounted by one of said supporting members and to be connected to the energizable elements of the sign, said series of contacts presenting a gap, a further series of contacts substantially fixedly mounted by the other of said supporting members and having continuous and sequential engagement with said first named contacts as said members are moved with respect to each other, switches independent of each other and electrically connected one to each of the contacts of said further series, means for mounting said switches by the supporting member mounting said latter contacts, and means movable with respect to said switches for operating the same, said operating means including means for selectively closing said switches to close circuits through the connected contacts, as well as the contacts of the first named series engaged thereby and the energizable elements connected to said contacts, and means also forming a part of said operating means for opening said switches to interrupt said circuits; the switch opening and closing means being disposed to cooperate with said switches when the contacts electrically connected thereto are traversing the gap in said first named series of contacts.

16. A controller for a sign having a number of elements to be energized in sequence, said controller including a pair of relatively movable supporting members, a series of contacts substantially fixedly mounted by one of said supporting members and to be connected to the energizable elements of the sign, a further series of contacts substantially fixedly mounted by the other of said supporting members and having continuous and sequential engagement with said first named contacts as said members are moved with respect to each other, switches independent of each other and electrically connected one to each of the contacts of said further series, means for mounting said switches by the supporting member mounting said latter contacts, means movable with respect to said switches for operating the same, said operating means including means for selectively closing said switches, means also forming a part of said operating means for opening said switches to interrupt said circuits, and means whereby the completion of a circuit through said switches at the moment they are closed, is prevented.

17. A controller for a sign having a number of elements to be energized in sequence, said controller including a pair of relatively movable supporting members, a series of contacts substantially fixedly mounted by one of said supporting members and to be connected to the energizable elements of the sign, a further series of contacts substantially fixedly mounted by the other of said supporting members and having continuous and sequential engagement with said first named contacts as said members are moved with respect to each other, switches independent of each other and electrically connected one to each of the contacts of said further series, means for mounting said switches by the supporting member mounting said latter contacts, means movable with respect to said switches for operating the same, said operating means including means for selectively closing said switches, means also forming a part of said operating means for opening said switches to interrupt said circuits, and means whereby, at the moment of the closing of said switches, as well as the opening of the same, circuits through said switches may not be completed.

18. A controller adapted to energize a sign having a field provided by individually illuminable elements—a certain area of said field being adequate to provide any desired complete character when selected elements included in the area are illuminated—said controller including one series of contacts in number at least equal to the illuminable elements in the field of the sign and being adapted to be connected one to each of the same, a further series of contacts movably mounted with respect to said one contact series and adapted to operatively bear against the same, switches arranged in groups and the number of switches in each group corresponding to the number of elements in a character area of the sign, leads connecting each of the switches in one group to a contact of the further series, and means for selectively and substantially simultaneously closing all of the switches of one group necessary to provide a complete character in the field of the sign.

19. A controller adapted to energize a sign having a field provided by individually illuminable elements—a certain area of said field being adequate to provide any desired complete character when selected elements included in the area are illuminated—said controller including one series of contacts in number at least equal to the illuminable elements in the field of the sign and being adapted to be connected one to each of the same, a further series of contacts movably mounted with respect to said one contact series and adapted to operatively bear against the same, switches arranged in groups and the number of switches in each group corresponding to the number of elements in a character area of the sign, leads connecting each of the switches in one group to a contact of the further series, means for selectively and substantially simultaneously closing all of the switches of one group necessary to provide a complete character in the field of the sign, and a number of contacts of said further series being interposed between the contacts connected to any individual switch group and being free from any connection with said switches, whereby, in the field of the sign, spacing is provided between successive characters.

EDWARD H. UNKLES.
BERT W. ROTH.
CHARLES S. WHITNEY, Jr.